Sept. 5, 1933. G. SUNDLÖF 1,925,470
TIMBER RECEIVING APPARATUS FOR LOG SAWS
Filed Dec. 11, 1931
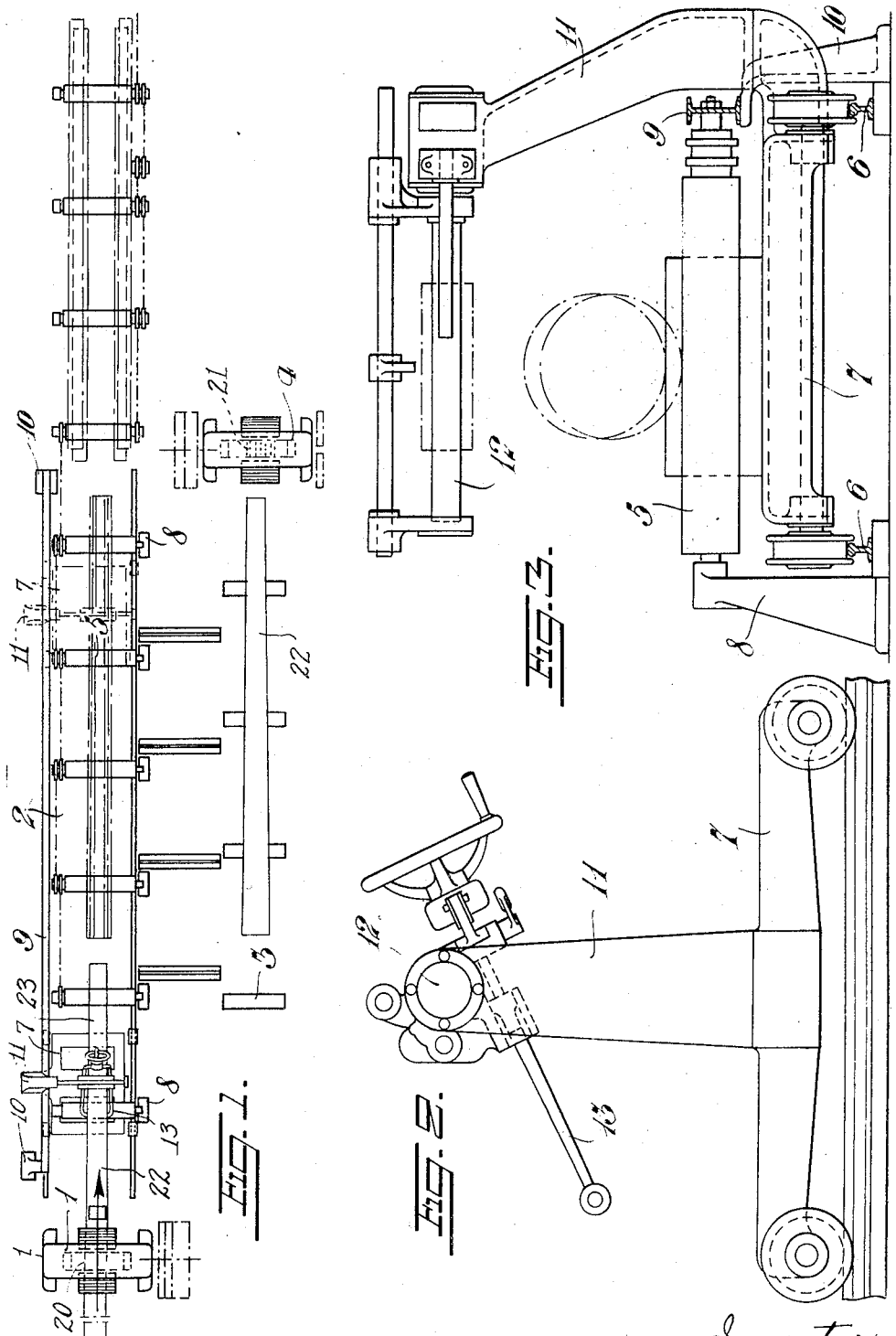
Inventor
Gustav Sundlöf
By Sommers & Young Attys.

Patented Sept. 5, 1933

1,925,470

UNITED STATES PATENT OFFICE 1,925,470

TIMBER RECEIVING APPARATUS FOR LOG SAWS

Gustav Sundlöf, Sodertalje, Sweden

Application December 11, 1931, Serial No. 580,394, and in Sweden December 29, 1930

5 Claims. (Cl. 143—105)

In the sawing of timber in saw frames or similar sawing machines it is already known to saw the log in a first saw frame into one or more large central blocks and one or more boards on each side of said central block or blocks and then put the block or blocks to the side in order to supply it or them to a second saw frame, while allowing the boards to move straight on in order to be then conveyed, for instance, to a saw for edging purpose.

The object of this invention is to provide an apparatus which is especially adapted for use in receiving the timber as delivered from the first saw frame of a sawing plant of the character above outlined, inasmuch as it allows an increased rate of production and permits the use of a short conveying path behind said frame for effecting the removal of the central block or blocks and their putting aside in order to transfer it or them to the second saw frame.

The invention is characterized, chiefly, by the provision behind the first saw frame of a rotation roller path in combination with a path arranged below said roller path which is adapted to carry a travelling carriage for clamping the timber carried by said roller path, said carriage providing a space above said roller path which is open to one side to receive the timber in order to allow it to be freely removed from the roller path to the said side, irrespective of the position of the carriage. It is thus seen that as soon as the timber under sawing has entirely left the saw frame, it is possible to immediately release the timber from the clamping device of the carriage and put the block or blocks aside, while allowing the boards to continue their movement on the roller path, whereas the carriage is returned towards the saw frame to receive the next timber delivered from the frame. If, on the contrary, a log carriage of well-known design were used, said carriage must stand still until the removal of the block or blocks had been completed with a resulting interruption following each sawing operation. With the use of the present apparatus said drawback will be overcome with a resulting increase of the output.

In the accompanying drawing one embodiment of the invention is illustrated. Fig. 1 is a plan view of a sawing plant comprising two saw frames and a receiving path according to this invention provided behind the first saw frame, and diagrammatically showing the logs in place in the apparatus. Fig. 2 is a side elevation of the travelling carriage. Fig. 3 is an end view of the roller path and the carriage path with the carriage shown in position thereon.

With reference to Fig. 1, the numeral 1 indicates a saw frame adapted to receive logs supplied in the direction of the arrow and saw them, for instance, into one or more central blocks and one or more boards on each side of said block or blocks. At the back end of the frame 1 is provided a path 2 to receive the timber and parallel to said path 2 there is provided another conveying path 3 to receive the central block or blocks 22, and supply it or them to a second saw frame 4. The boards 23 are advanced farther on the path 2 in order to be passed, for instance, to a saw for edging purpose or the like. The receiving path 2 comprises, in part, a set of rollers 5, all of which are shown as being positively driven except the one situated nearest to the frame 1, and, in part, a pair of rails 6, provided below the roller path, which is adapted to support a travelling carriage. Those rollers 5 which are situated on that part of the roller path 2 which extends from frame 1 to frame 4 are positioned at such a level above the rails 6 as to allow the frame 7 of the travelling carriage to pass below the rollers 5 of the path 6, as shown in Fig. 3. The rollers 5 are mounted at their ends facing the path 3 in individual bearing blocks 8 and rest at their opposite ends in bearings formed in a longitudinally extending beam 9, supported at its ends by two standards 10 one of which is situated adjacent the frame 1 and the other substantially opposite the frame 4. Between the two standards 10 the space below the beam 9 is entirely free so as to allow an upwardly bent arm 11 extending from the carriage frame 7 to project beyond and above the beam 9. Said arm 11 carries at an appropriate level above the rollers 5 a shaft 12 to support clamping or gripping arms 13 together with the associated controlling mechanism. Between shaft 12 and the roller path 5 ample space is provided to receive the timber to be advanced on the rollers 5 while being held together by the gripping arms 13. Said space is entirely open to the side facing the path 3 and, as a result, the travelling carriage may in no way interfere with the removal of timber from the rollers 5 to the path 3 irrespective of the position of the carriage with respect to the roller path and, likewise, the carriage cannot interfere with the continued advancement on the roller path 5 of that timber which is not transferred to the path 3.

It is thus seen that, as soon as the timber has entirely passed through the frame 1, the travelling carriage may be caused to release the timber and this being completed, the carriage may be immediately moved back again towards the frame 1 in order to receive the next log to be sawed without in any way interfering with the above said transfer of the blocks to the path 3, nor with the continued advancement of the boards on the path 5. As a result, any interruption of the sawing operation between succeeding logs need not take place.

It is to be noted that the invention may be also applied to other combinations of saw frames than that shown in the drawing without departing from its principle or scope as defined by the claims.

What I claim is:—

1. Apparatus for receiving timber from log saws which comprises in combination a rotation roller path to carry the timber as delivered from the saw, means to support said roller path so as to leave a free space below the roller path along one side thereof, another path situated beneath said roller path, a travelling carriage on said other path, means to clamp the timber carried by said roller path, an arm on the carriage projecting through said space to carry said timber clamping means while providing a free space above the roller path which is open to the side of the path remote from the arm.

2. Apparatus for receiving timber from log saws which comprises in combination a first conveying path to carry the timber as delivered from the saw, a second path situated beneath said conveying path, a travelling carriage on said second path, means to clamp the timber carried by said first path, means at one side of the carriage to carry said clamping means while providing a free space above the first path to receive the timber which is open to the side of the path remote from said carrying means, and a third path parallel to said first path to receive timber therefrom.

3. Apparatus for receiving timber from saw frames which comprises in combination a path extending from the saw frame, a travelling carriage on said path, a conveying path to receive the timber as delivered from the saw frame arranged in superimposed relation to said first-mentioned path so as to project over the carriage travelling thereon, and means on said carriage to clamp the timber on said conveying path, the carriage being constructed to leave a free space above the carriage supporting path open to one side, which is adapted to provide space for said conveying path and the timber carried thereon.

4. Apparatus for receiving timber from saw frames which comprises in combination a rotation roller path extending from the saw frame to carry the timber as delivered from the saw frame, another path situated beneath said roller path, and a travelling carriage on said other path, said carriage leaving a free space open to one side to receive said roller path and the timber carried thereon, said carriage having means to clamp the timber carried on said roller path.

5. Apparatus for receiving timber from saw frames which comprises in combination a rotation roller path to receive the timber as delivered from the saw frame, another path arranged beneath said roller path, a carriage on said other path, means on said carriage to support a timber clamping mechanism in such a way as to leave a free space above the carriage to allow the carriage to move beneath the roller path and allow the timber to be delivered from the roller path on one side of the carriage, and a second roller path arranged parallel to said first-mentioned path on that side thereof to which the timber may be delivered.

GUSTAV SUNDLÖF.